Oct. 8, 1929.   E. R. BURTNETT   1,731,228
INTERNAL COMBUSTION ENGINE
Filed Jan. 24, 1927   2 Sheets-Sheet 2
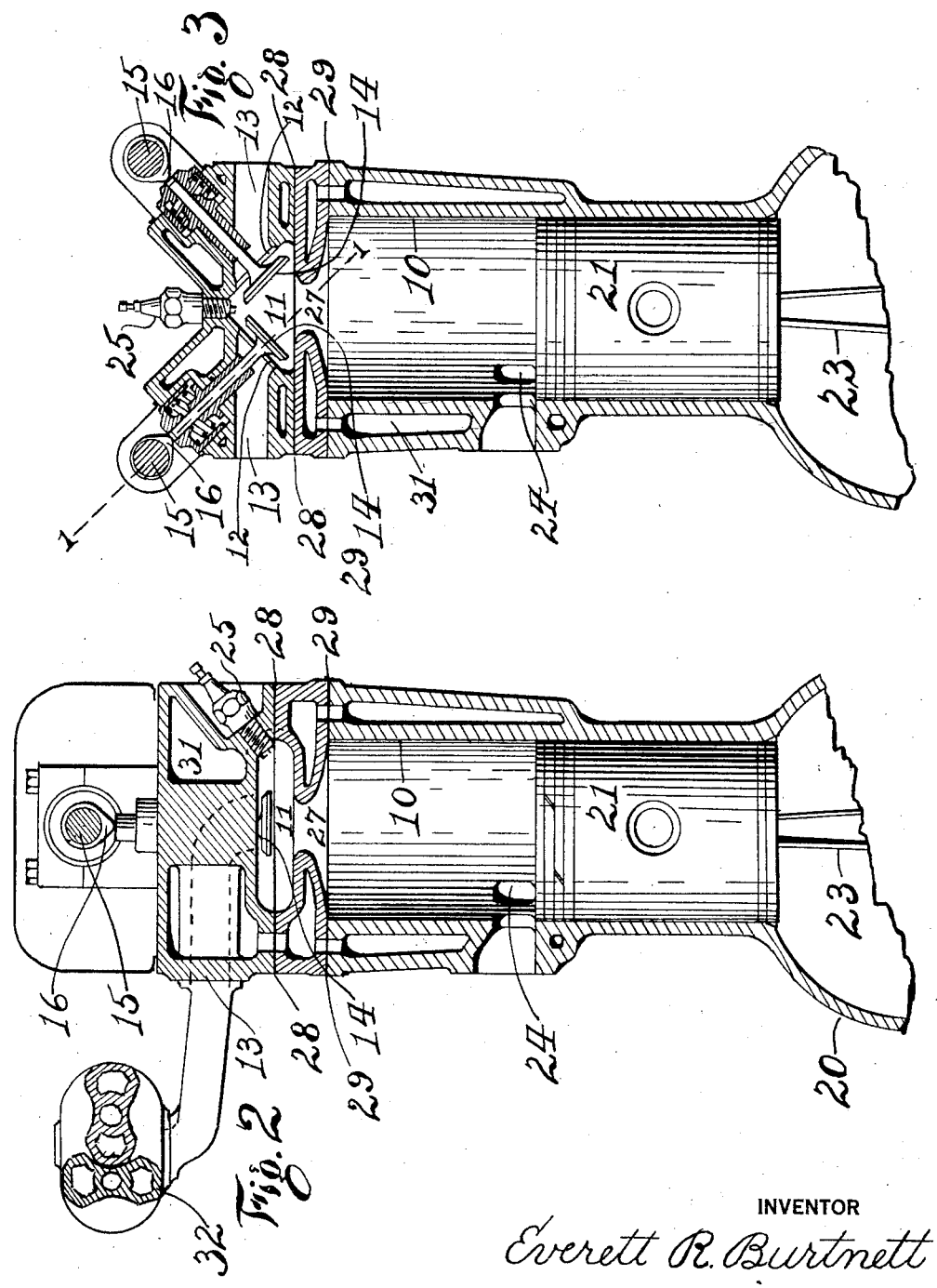
INVENTOR
Everett R. Burtnett Patented Oct. 8, 1929

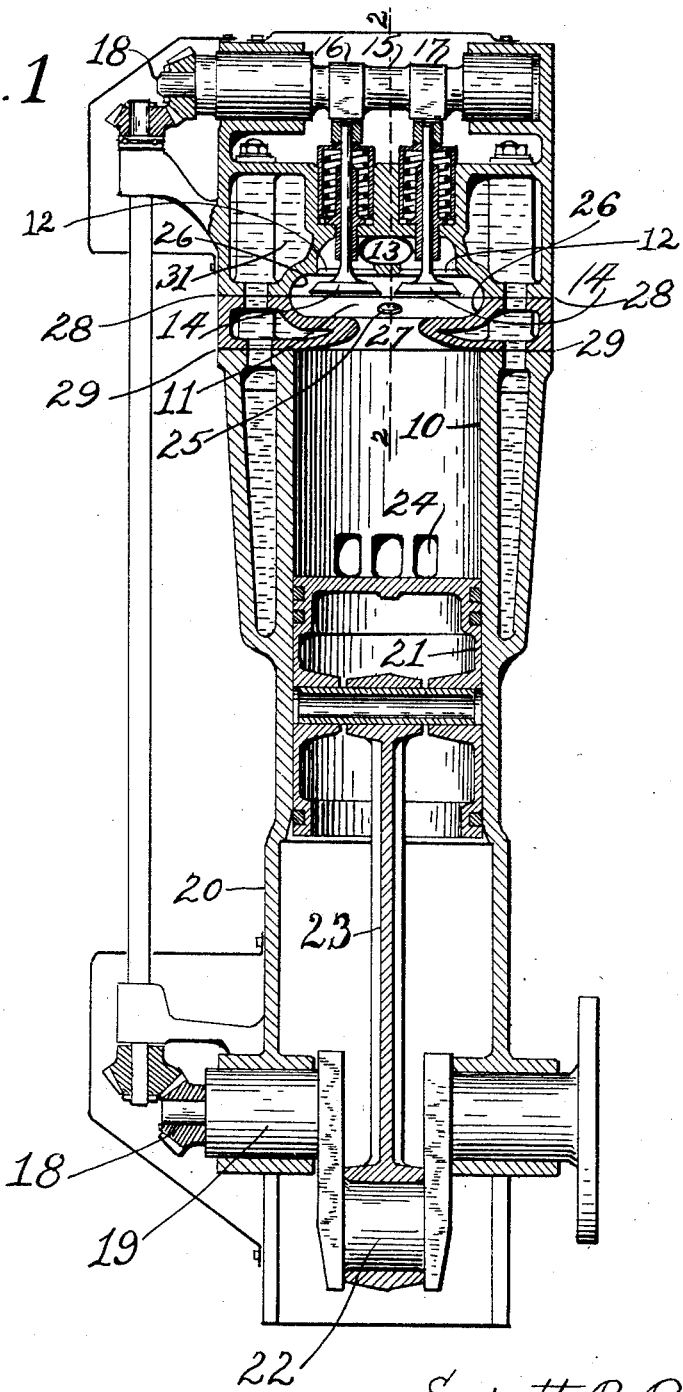

1,731,228

UNITED STATES PATENT OFFICE

EVERETT R. BURTNETT, OF LOS ANGELES, CALIFORNIA, ASSIGNOR, BY DIRECT AND MESNE ASSIGNMENTS, TO THE AUTOMOTIVE VALVES CORPORATION, OF RENO, NEVADA, A CORPORATION OF NEVADA

INTERNAL-COMBUSTION ENGINE

Application filed January 24, 1927. Serial No. 163,108.

My invention relates generally to internal combustion engines and particularly to the two stroke cycle type, the principal objects of my invention being to generally improve upon the existing construction of two stroke cycle engines wherein poppet type valves are employed as valvular means of admitting fresh fuel charge to the combustion chamber.

In any case of a two stroke cycle engine the time period of inlet port open duration to the combustion chamber must of necessity be relatively short in comparison to the inlet valve timing of four stroke cycle engines.

In an engine wherein high actuating speed is attained of the valve mechanism, the cam must be of slight form if silence and longevity of the valve parts is to be maintained; obviously in the case of a two stroke cycle engine wherein poppet type valves are used employing a cam for mechanical actuation, the cam must be of small lobe length, short lobe height and very gradual in acceleration and declaration.

The limits set on the poppet valve timing in the case of two-stroke cycle engines requires the valve weights be kept as low as possible, to maintain light valves necessitates the use of small diameter valves, obviously this requirement necessitates the use of dual valves if the necessary ratio of valve port area is to be provided for high volumetric efficiency at high speeds.

It is the object of my invention to provide a poppet valve structure of two poppet type valves for controlling the admission of fresh charge into the combustion chamber, and to provide a compression and combustion clearance chamber into which the said valves are unseated, which chamber being formed to expedite efficient scavenging of the residual products of combustion from the combustion chamber and also effect the localization of a small quantity of fresh charge in stratified form in the vicinity of the point of admission adjacent to which a sparking or ignition device may be applied.

It is a further object of my invention to divide the construction of the clearance chamber in such a manner as will permit machining of the entire surface of the novel shaped chamber and facilitate the machining of the valve seats and the assembly and removal of the valves.

With the foregoing and other objects in view, my invention consists in certain novel features of construction and arrangement of parts that will be hereinafter more fully described and claimed and illustrated in the accompanying drawings in which:

Fig. 1 is a vertical longitudinal section taken through the center of the combustion cylinder of my improved engine and inlet valve structure that is directly associated therewith.

Fig. 2 is a vertical cross section taken on line 2—2 of Fig. 1.

Fig. 3 is a vertical cross section taken transversely of an engine constructed of the principal of my invention illustrating a modified form of my improved construction wherein four poppet type valves are seated in the combustion chamber.

The valve structure of the form and arrangement shown in Fig. 1 is illustrative of a section taken on line 1—1 of Fig. 3.

Referring by numerals to the accompanying drawings, which illustrate a practical embodiment of my invention, 10 designates a combustion cylinder and 11 the compression and combustion clearance space to the said cylinder; inlet ports 12 are formed through the wall of the combustion chamber and inlet communication passages 13 extend from the inlet ports 12 to the exterior of the engine.

Poppet type valves 14 are arranged to seat the inlet ports 12 of the combustion chamber, a cam shaft 15 is arranged axially longitudinally with respect to the engine, cam lobes 16 and 17 are formed of the cam shaft 15 preferably in the plane of the axes of the valve stems of the valves to which the respective cams are in direct association.

Cam shaft actuating gearing 18 provides the rotative movement to the cam shaft 15 in timed relation successively in ratio one to one with the rotary movement of a crank shaft 19 arranged in a crank case 20 which surmounts the combustion cylinder 10.

A piston 21 is arranged for reciprocatory movement within the combustion cylinder 10, a crank 22 is formed of the crank shaft and a connecting rod 23 connects the piston 21 with the crank 22 of the crank shaft in the usual manner.

Exhaust ports 24 are formed through the wall of the combustion chamber 10 at a point where they are wholly uncovered only when piston 21 is at crank end dead center of the stroke.

The cam lobes 16 and 17 are arranged relatively, rotatively in time alike providing synchronous valve movement to the multiple of inlet valves directly associated with a given combustion chamber.

An ignition device 25 is secured in the wall of the combustion chamber at a point which will permit the sparking electrodes protruding the compression clearness chamber in close proximity of the inlet valves 14.

The wall 26 of the compression clearance space 11 is formed preferably of a line extending from the outer radius of each inlet valve to the outer radius of the adjacent inlet valve with sufficient clearance provided between the radius of the valve and the wall to facilitate the inflow of the fresh charge radially with respect to the axis of each valve without obstruction.

The wall 26 is formed to extend inwardly toward the axis of the bore of the combustion cylinder 10 uniformly from the point of extreme width in the plane of the valves sweep area, when said valves are actuated, providing a throat construction approaching a Venturi form between the clearance chamber port into which the valves protrude and the clearance chamber part forming the area adjacent and directly headward of the piston 21 when said piston is at a position of head end dead center of the stroke, this Venturi formed throat is designated as 27. The cylinder head structure is preferably divided in a plane substantially central of the compression chamber 11 into which chamber the valves 12 protrude when actuated, the divided head structure being attached at two machined faces concordant at the point 28.

The entire cylinder head structure is preferably provided as a detachable member from the structure of the cylinder 10, the head structure and the cylinder structure being attached at the point 29. The walls of the combustion cylinder 10, compression clearance chamber 11 Venturi throat 27 and valve guides are preferably formed with connected chambers 31 through which may be circulated a fluid cooling medium such as water.

A fresh charge induction device 32 is shown in communication with the inlet passage extending to the inlet valve ports 12, the Roots blower type pumping device is illustrated, but it will be understood that any suitable means may be employed as may be desired.

The operation of my improved internal combustion engine is as follows:

Assuming the piston 21 to be in the position as illustrated in the accompanying drawings, at crank end dead center, the cam lobes 16 and 17 of the cam shaft 15 will be at a point effecting the movement of the poppet valves 14 inwardly with respect to the combustion chamber, obviously the exhaust ports 24 are open and the inlet ports 12 are open at this moment.

The spent products of combustion are released from the combustion chamber through the exhaust ports 24 and a fresh charge is admitted to the combustion chamber through inlet passage 13 and inlet ports 12 by the inductive influence developed by the rotary movement of the impellers of the blower 32.

At a time coincident with the movement of the piston 21 a short distance headwardly on the compression stroke following its described position of crank end dead center the exhaust ports 24 will be cutoff from port registration with the combustion chamber and the cam lobes 16 and 17 of the cam shaft 15 will rotate out of contact with the inlet poppet valves 14, permitting the said valves to seat in the inlet ports 12, providing a cutoff of the inlet port registration with the combustion chamber, further movement of the piston 21 headwardly developing compression of the charge within the chamber.

The form of my improved combustion clearance chamber construction will permit the fresh charge to remain in the head end of the clearance chamber 11 during compression and to emerge from the chamber 11 uniformly through the Venturi throat 27 and enter the cylindrical chamber of the combustion cylinder 10 during the period of induction scavenging and exhaust in an expanding manner, preserving the stratification of the fresh charge. Obviously during the period of compression by the headward movement of the piston 21, the fresh charge will retract into the head end of the combustion chamber.

At the time the piston 21 is in a position of approximate head end dead center, compression being the greatest, ignition will be caused to take place, combustion following and the expansion of the gases forcing the piston 21 crankwardly through the cylinder 10 to a crank end dead center position coincident with my initial description of the cycle of operation.

An engine of my improved construction is comparatively simple, may be easily and cheaply constructed, providing an effective and light valve means for controlling the admission of fresh fuel charge to the chamber of the combustion cylinder, being void of rocker arms and push rods, the receptive weight of the individual valve and actuating parts is minimized to a degree permitting a very high actuating speed being accomplished with the short time period for the opening and closing of the inlet valves as imposed by the nature of the two stroke cycle engine.

It will be undersrtood that minor changes in the size, form and construction of the various parts of my improved engine may be made and substituted for those herein described without departing from the spirit of the invention, the scope of which is set forth in the appended claims.

I claim as my invention:

1. In an internal combustion engine, a combustion cylinder, a cylinder head formed in two parts, a compression clearance chamber formed in the underside of the upper part of said two part cylinder head, and in the upper portion of the lower part of said two part head a relatively small Venturi throat formed in the center of the lower member of the two part head and connecting said compression clearance chamber with the head end of the chamber in the combustion cylinder, exhaust ports formed through the wall of the combustion cylinder, a piston arranged for reciprocatory movement within the combustion cylinder, a plurality of inlet ports to the compression clearance chamber, a plurality of inlet poppet type valves arranged to close the plurality of inlet ports to the compression clearance chamber of the combustion cylinder, said valves being arranged in pairs on opposite sides of the axis of the engine cylinder, the planes occupied by the axes of the two pairs of valves being substantially 180° apart and 45° from the axis of the engine cylinder, mechanical means providing synchronously opening and closing actuation to the plurality of inlet valves, all of the inlet valves comprising the plurality of inlet valves associated to a given combustion cylinder being arranged to seat in one compartment of the compression clearance chamber, and ignition means located in the compression clearance chamber adjacent the inlet valves.

2. In an internal combustion engine, a cylinder, a piston arranged for reciprocatory movement within the cylinder exhaust ports formed through the wall of the cylinder, a two part head, a compression clearance space formed in said two part head on opposite sides of the dividing line between the two parts, the said compression clearance space being formed coaxial with the axis of the cylinder, a communication passage formed in the lower member of the two part head between the compression clearance space and the chamber within the cylinder, the said communication passage being of restricted area relatively with respect to the area of the said compression clearance space and the chamber within the cylinder to which it is associated, inlet ports formed in the head of the compresson clearance chamber, two pairs of poppet type inlet valves arranged to seat in the said inlet ports of the said compression clearance space, said pairs of poppet valves being disposed on opposite sides of the axis of the engine cylinder, said pairs of valves being arranged 180° apart and occupying angular planes 45° from the axis of the engine cylinder and from the gaseous fuel inlet ducts that lead through the head of the engine to the chamber occupied by said valves, a cam shaft, means associating the cam shaft with the poppet type valves providing mechanical actuation of the said valves, a crank shaft, a crank formed of the crank shaft, a connection between the said crank and the piston within the cylinder, positive driving means arranged between the crank shaft and cam shaft and means associated with the cam shaft providing the actuation of the said poppet type valves from their respective inlet port seats synchronously in valve movement with respect to the plurality of valves and in time successively simultaneous with the period of time between the moments the piston reciprocatively arranged within the cylinder approaches and departs from the position of crank end dead center.

3. In an internal combustion engine, a combustion cylinder, a member removably positioned on the head end of said cylinder, which member is provided in its upper portion with a depression, there being a short Venturi throat connecting the center of said depression with the head end of the chamber in the combustion cylinder, an upper head member removably positioned on the first mentioned head member and provided in its under surface with a depression that coincides with the depression in the upper portion of said first mentioned head member, there being inlet ports communicating with the depression in the upper head member, two pairs of inlet poppet valves arranged for operation in the upper head member, said pairs of valves being disposed on opposite sides of the axis of the engine cylinder, the planes occupied by the axes of the two pairs of poppet valves being disposed 180° apart and 45° from the axis of the cylinder and from the inlet ports that lead to the valve chamber, and mechanically actuated means for simultaneously unseating all of said valves.

In testimony whereof I affix my signature.

EVERETT R. BURTNETT.